Patented Feb. 26, 1935

1,992,461

UNITED STATES PATENT OFFICE 1,992,461

WATERINSOLUBLE AZODYESTUFFS

Max Baltes and Kurt Briesewitz, Leverkusen-I. G.-Werk, and Arthur Zitscher, Offenbach-on-the-Main, Germany, assignors to General Aniline Works, Inc., New York, N. Y., a corporation of Delaware No Drawing. Application April 27, 1934, Serial No. 722,806. In Germany May 10, 1933

10 Claims. (Cl. 260—95)

The present invention relates to new water-insoluble azodyestuffs and to fibres dyed with the said dyestuffs, more particularly it relates to dyestuffs of the probable general formula:

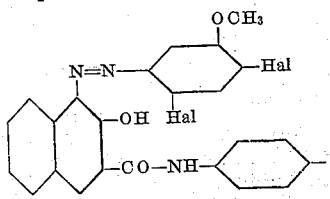

wherein Hal stands for a halogen atom, such as a chlorine or bromine atom, and $x$ stands for hydrogen or an alkoxy group, such as a methoxy or ethoxy group.

Our new dyestuffs are obtainable by diazotizing a 4.6-dihalogen-3-anisidine (OCH$_3$=1) in the usual manner and coupling in substance or on a substratum, especially the vegetable fibre, with the anilide or a p-alkoxyanilide of 2-hydroxynaphthalene-3-carboxylic acid.

Those dyestuffs prepared in substance are generally red powders and are valuable pigments, while those prepared on the fibre, especially the vegetable fibre, according to the usual processes of preparing ice colors generally yield red vivid shades of good fastness to light, chlorine and boiling. The dyeings are technically valuable because when produced by a printing process as resists under dyeings of diazo salts of 4-aminodiphenylamine or its substitution products they yield red shades of remarkable clarity and fastness to light.

The invention is illustrated by the following examples, without being limited thereto:

*Example 1:*—50 grams of cotton yarn are impregnated for about half an hour in a solution prepared by dissolving 4.5 grams of 2.3-hydroxynaphthoic acid-p-anisidide in some water with the addition of 9 ccs. of Turkey red oil of 50% strength, 9 ccs. of aqueous caustic soda solution of 34° Bé and filling up with water to one litre. The cotton is squeezed and without rinsing introduced for about 20 minutes into a diazo solution prepared in the following manner:

1.92 grams of 4.6-dichloro-3-anisidine, having a melting point of 52° C., are diazotized, while cooling with ice, with 3.2 ccs. of hydrochloric acid of 22° Bé and 0.72 grams of sodium nitrite. When the diazotization is complete, excess mineral acid is neutralized by adding 2 grams of sodium acetate, then 20 grams of common salt are added, and the solution is filled up with water to one litre. A clear red of very good fastness to light is thus obtained. The dyestuff corresponds to the following formula:

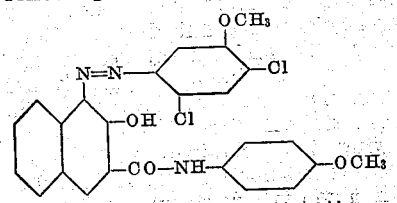

*Example 2:*—50 grams of cotton tissue are impregnated for about half an hour in one litre of an impregnating bath, prepared in the usual manner from 15 grams of 2.3-hydroxynaphthoic acid anilide. The cotton is rinsed, dried and printed with a printing color prepared in the following manner:

13 grams of 4.6-dichloro-3-anisidine (OCH$_3$=1) are dissolved with 22 grams of hydrochloric acid of 22° Bé and 231 ccs. of water and diazotized, while cooling, with 22 grams of sodium nitrite and mixed with 500 grams of a neutral starch tragacanth thickener, the excess mineral acid is neutralized by adding 12 grams of sodium acetate, and the whole is mixed with 200 grams of aluminium sulfate 1:1. After this the print is dried and developed on a two-rolls-foulard with one litre of an aqueous solution containing 35 grams of diazotized 4-amino-4'-methoxydiphenylamine. After exposing for a short time to the air, the print is introduced into a bath containing in one litre 5 ccs. of hydrochloric acid of 22° Bé, rinsed at 70° C., soaped, again rinsed and dried. A clear red is obtained beside a full, red blue. The red dyestuff corresponds to the following formula:

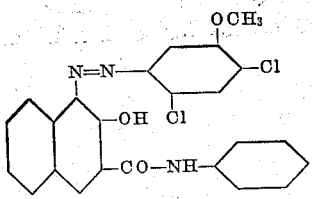

*Example 3:*—50 grams of cotton yarn are impregnated for about 20 minutes in a bath prepared in the usual manner from 13 grams of 2.3-hydroxynaphthoic acid anilide, 36 grams of aqueous caustic soda solution of 34° Bé, 24 grams of Turkey red oil and 1500 ccs. of water. The cotton is then introduced for about 20 minutes into a diazo solution prepared in the following manner:

12 grams of 4-chloro-6-bromo-3-anisidine (OCH$_3$=1) of the melting point 51–52° C. are diazotized with 20 ccs. of hydrochloric acid of 22° Bé and 3.6 grams of sodium nitrite, while cooling with ice. A clear red of good fastness properties is thus obtained. The dyestuff corresponds to the following formula:

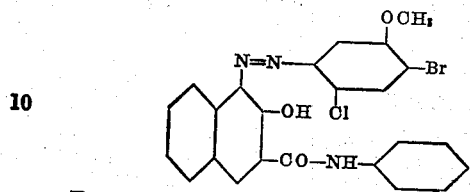

By substituting the 2.3-hydroxynaphthoic acid anilide by an equivalent quantity of 2.3-hydroxynaphthoic acid-p-phenetidide, there are obtained similar shades.

Example 4:—19.2 grams of 4.6-dichloro-3-anisidine are diazotized in the usual manner with hydrochloric acid and sodium nitrite. The diazo solution is coupled with a solution prepared in the usual manner from 29,3 grams of 2.3-hydroxynaphthoic acid-p-anisidide in dilute aqueous caustic soda and Turkey red oil and containing sodium acetate in a quantity sufficient for binding the excess mineral acid. The dyestuff separating is filtered and well washed. After drying, it is obtained in form of a red powder which is soluble in concentrated sulfuric acid with a violet coloration.

We claim:

1. Waterinsoluble azodyestuffs of the general formula:

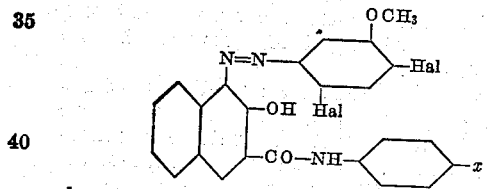

wherein Hal stands for a halogen atom and $x$ stands for hydrogen or an alkoxy group, being generally red powders, and yielding, when produced on the fibre, generally red shades of good fastness to light, chlorine and boiling.

2. Waterinsoluble azodyestuffs of the general formula:

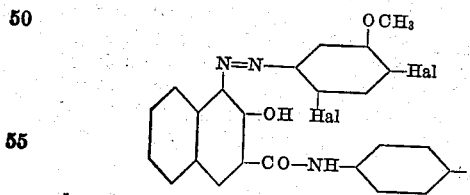

wherein Hal stands for a chlorine or bromine atom and $x$ stands for hydrogen, a methoxy or ethoxy group, being generally red powders, and yielding, when produced on the fibre, generally red shades of good fastness to light, chlorine and boiling.

3. The waterinsoluble azodyestuff of the following formula:

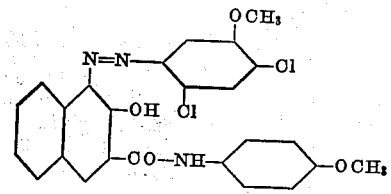

being a red powder, and yielding, when produced on the fibre, red shades of good fastness to light, chlorine and boiling.

4. The waterinsoluble azodyestuff of the following formula:

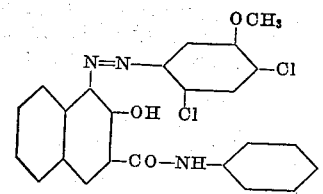

being a red powder, and yielding, when produced on the fibre, red shades of good fastness to light, chlorine and boiling.

5. The waterinsoluble azodyestuff of the following formula:

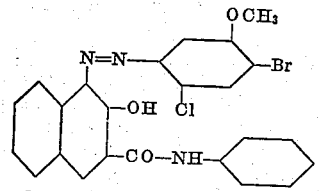

being a red powder, and yielding, when produced on the fibre, red shades of good fastness to light, chlorine and boiling.

6. Fibres dyed with a dyestuff as claimed in claim 1.

7. Fibres dyed with a dyestuff as claimed in claim 2.

8. Fibres dyed with the dyestuff as claimed in claim 3.

9. Fibres dyed with the dyestuff as claimed in claim 4.

10. Fibres dyed with the dyestuff as claimed in claim 5.

MAX BALTES.
KURT BRIESEWITZ.
ARTHUR ZITSCHER.